United States Patent [19]

Cesca et al.

[11] Patent Number: 4,524,092
[45] Date of Patent: Jun. 18, 1985

[54] PROCESS AND A COMPOSITION FOR COATING A METALLIC SUBSTRATE WITH A POLYMERIC FILM

[75] Inventors: Sebastiano Cesca; Aldo Priola, both of S.Donato Milanese; Fiorenzo Renzi, Gorgonzola, all of Italy

[73] Assignee: Anic S.p.A., Italy

[21] Appl. No.: 530,002

[22] Filed: Sep. 7, 1983

[30] Foreign Application Priority Data

Sep. 15, 1982 [IT]  Italy ................ 23291 A/82

[51] Int. Cl.³ .......................................... B05D 3/02
[52] U.S. Cl. ........................ 427/388.2; 148/6.14 R; 148/6.15 R
[58] Field of Search ............. 427/388.2; 148/6.14 R, 148/6.15 R

[56] References Cited

U.S. PATENT DOCUMENTS

| | | | |
|---|---|---|---|
| 4,105,811 | 8/1978 | Horwitz et al. | 427/388.2 X |
| 4,210,702 | 7/1980 | Dalibor | 427/388.2 X |
| 4,366,195 | 12/1982 | Hall | 427/388.2 X |
| 4,421,569 | 12/1983 | Dichter et al. | 148/6.14 R |

Primary Examiner—Thurman K. Page

[57] ABSTRACT

There is disclosed the coating of a metallic substrate with a cross-linked polymeric film by contacting the substrate with an aqueous composition containing:
at least an acrylic or metacrylic compound which can be defined by the general formula:

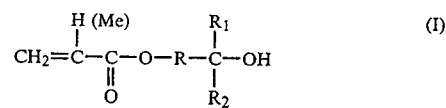

wherein:
R is a straight-line or branched aliphatic hydrocarbon radical, either saturated or unsaturated containing from 2 to 10 carbon atoms, or a cycloaliphatic or an aromatic group;
$R_1$ and $R_2$, equal to or different from one another, are straight-line or branched alkyl groups, either saturated or unsaturated and containing from 1 to 8 carbon atoms, or cycloaliphatic or aromatic groups;
at least one unsaturated organic acid capable of being copolymerized with the compound (I), in an amount of from 5 to 40 parts by weight per 100 parts of the compound (I) or an organic or a mineral acid which cannot be copolymerized with the compound (I) in an amount of from 1 to 10 parts by weight per 100 parts of the compound (I), and
a polymerization catalyst preferably selected from among the persulphates, the hydroperoxides, the peracids $H_2O_2$ and the peroxides.

A metallic substrate coated by the composition of polymeric nature as described above is then heated to a temperature equal to, or lower than 180° C. approximately and for the time which is necessary to originate a polymeric film cross-linked upon said substrate.

A film so deposited exhibits optimum properties as to adherence, resistance to bending and shocks and resistance to the saline mist.

11 Claims, 3 Drawing Figures

PROCESS AND A COMPOSITION FOR COATING A METALLIC SUBSTRATE WITH A POLYMERIC FILM

This invention relates to a process for coating a metallic substrate with a cross-linked polymeric film.

The invention also relates to the composition which is adapted to form such a film.

It is usual in the art to coat metallic substrates with a protective polymeric film. More particularly, it is interesting to apply such polymeric film by the so-called in situ polymerization procedure on metallic substrates.

According to said procedure, the operation is made with acrylic or metacrylic polymers in an aqueous medium, in an acidic environment and in the presence of a polymerization catalyst, such as disclosed, for example, in "La Chimica e l'Industria", 62, 16 (1980).

It is of quite particular interest in the art to prepare polymers containing functional reactive groups, capable of starting cross-linking reactions by heating to bland temperatures, so as to obtain, with comparatively low consumptions of power, the formation of a tridimensional lattice which imparts to the material particular properties of resistance to chemicals and physically aggressive agents.

This requirement is quite particularly appreciated in the field of enamels, paints and coatings in general, which at present require oven treatments at high temperatures so as to carry out the cross-linking of the polymeric film.

It has now been found that such a requirement can be fulfilled, according to the present invention, by selecting quite particular acrylic or metacrylic monomers which contain in their molecules a tertiary alcoholic group as a side appendage.

Consequently, according to the present invention, a metallic substrate is coated by a cross-linked polymeric film by contacting the substrate with an aqueous composition which contains:

at least an acrylic or metacrylic compound which can be defined by the general formula:

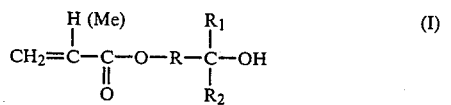

wherein:

R is a straight-line or branched aliphatic hydrocarbon radical, either saturated or unsaturated containing from 2 to 10 carbon atoms, or a cycloaliphatic or an aromatic group;

$R_1$ and $R_2$, equal to or different from one another, are straight-line or branched alkyl groups, either saturated or unsaturated and containing from 1 to 8 carbon atoms, or cycloaliphatic or aromatic groups;

at least one unsaturated organic acid capable of being copolymerized with the compound (I), in an amount of from 5 to 40 parts by weight per 100 parts of the compound (I) or an organic or a mineral acid which cannot by a copolymerized with the compound (I) in an amount of from 1 to 10 parts by weight per 100 parts of the compound (I) and a polymerization catalyst preferably selected from among the persulphates, the hydroperoxides, the peracids, $H_2O_2$ and the peroxides, and subsequently heating the substrate coated by the polymeric layer formed according to what is described in the present invention to a temperature equal to or lower than about 180° C., for the time which is necessary to obtain a cross-linked polymer having such characteristics as to physical properties, adhesion, flexibility, hardness, capable of ensuring an optimum technological and chemical resistance behaviour by the protective coating thus formed.

Figure 1:
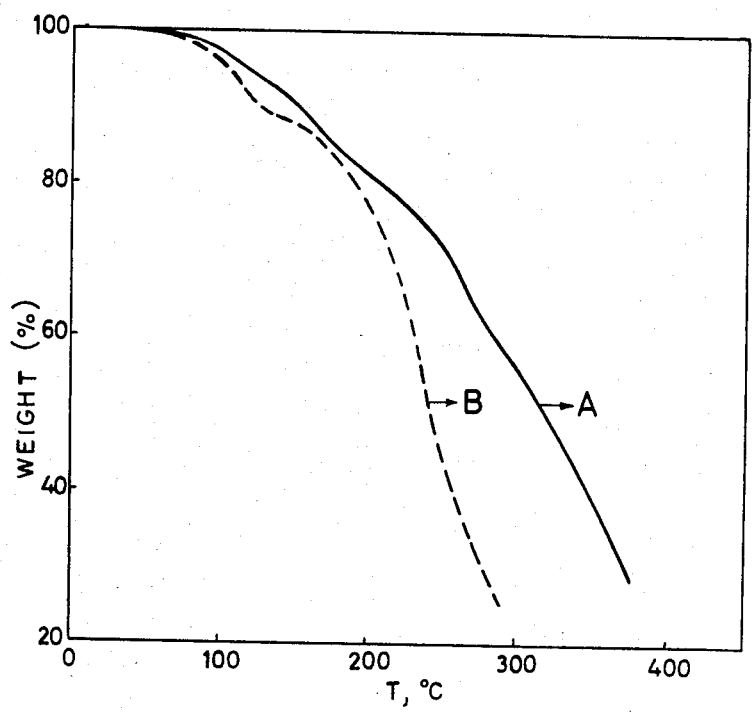
FIG. 1 represents the plots obtained when two samples (A and B) of polymerized 2-hydroxy-2-methylpropyl acrylate are subjected to thermogravimetric analysis.

This coating procedure, known as in situ polymerization, provides for the immersion of the metallic article in an acidic aqueous solution which contains said acrylic monomers and the polymerization catalysts. By interaction of the catalysts with the $Fe^{++}$ ions which are present on the metal surface, the radicalic species are orignated, which prime the polymerization of the acrylic monomers leading to the formation of a homogeneous and continuous layer of polymer to coat the substrate. This polymeric coating is subsequently cross-linked by heating in an oven to a temperature equal to or lower than about 180° C.

Under these conditions, a dehydration of the polymer takes place concurrently with the formation of reactive unsaturations which react thereafter mutually to bring about the formation of an insoluble tridimensional lattice.

Examples of compounds (I) which are useful to the ends of the present invention are: 2-hydroxy-2-methylpropyl acrylate, 2-hydroxy-2-methylpropyl metacrylate, 2-hydroxy-2-ethylpropyl acrylate, 2-hydroxy-1,2-dimethylpropyl acrylate, 2-hydroxy-1,1', 2-trimethylpropyl acrylate, the monoacrylate and the monometacrylate of 2,5-dimethyl-2,5-hexanediol, the monoacrylate and the monometacrylate of the 2,5-dimethyl-2,5-dihydroxy-3-hexene and the monoacrylate and the monometacrylate of the 2,5-dimethyl-2,5-dihydroxy-3-hexyne.

The compounds (I) can be obtained with high yields by adopting any of the procedure to be detailed hereinafter:

addition of acrylic or of metacrylic acid to epoxide compounds having at least two alkyl substituents on the same carbon atom, such as :

1,1'-dimethyl-ethylene oxide, 1,1',2-trimethyl-ethylene oxide and 1,1',2,2'-tetramethyl-ethylene oxide, such reaction taking place under bland conditions and with a high yield when catalysts are present which consist of chlorides, bromides or iodides of tetralkylammonium or aryl-substituted.

esterification of glycols of tertiaries with acryloyl chloride or metacryloyl chloride or with acrylic or metacrylic acid. Such di-tert.glycols can easily be obtained by double condensation between acetylene and ketonic compounds.

According to an embodiment of the present invention, the above described compound (I) can partially be substituted by another acrylic monomer deprived of a tert.alcoholic group as a side appendage. The advantages of the present invention are obtained, again, whenever said compound (I) is replaced by a quantity up to 90% by weight of monomers, such as: methyl acrylate and metacrylate, ethyl acrylate and metacrylate, butyl acrylate and metacrylate, 2-ethylhexyl acrylate and metacrylate, 2-hydroxyethyl acrylate and metacrylate, 2-hydroxypropyl acrylate and metacrylate, 4-hydroxybutyl acrylate and metacrylate, and 2-hydroxybutyl acrylate and metacrylate.

The unsaturated organic acid capable of being copolymerized with the compound (I) and which are present in the compositions according to the present invention are appropriately selected from among: acrylic acid, metacrylic acid, adduct of 2-hydroxyethyl acrylate or metacrylate wth maleic acid anhydride and parastyrenesulphonic acid.

The organic or the mineral acids which cannot be copolymerized with the compound (I) and which can be present in the compositions of the present invention to substitute the above mentioned unsaturated organic acids are appropriately selected from among: paratoluenesulphonic acid, methanesulphonic acid, sulphuric acid and phosphoric acid.

The polymerization catalysts which are present in the composition according to the present invention can be selected from among:

Potassium persulphate, ammonium persulphate, cumene hydroperoxide, tert.butyl hydroperoxide, peracetic acid and hydrogen peroxide, in combination with oxidizable ions such as ferrous ions coming from the metallic substrate.

Thermolabile initiators can also be used, such as: benzoyl peroxide, azo-bis-diisobutyronitrile, lauroyl peroxide and tert.butyl perbenzoate.

Most appropriately, the polymerization catalysts are present in the composition according to the present invention in an amount variable from 0.5 to 5 parts by weight per 100 parts by weight of mixture of reactant monomers.

Other additional components, which may be present in the composition according to the present invention, are: epoxyacrylic resins, urethane-acrylic resins, pigments and additives of various nature.

Examples of pigments which can be used are: kaolin, titanium dioxide, zinc phosphate, lead chromate and baryum carbonate.

The importance is known of the introductin of pigments in the coating in order to improve the corrosion resistance properties of the coating, as well as the importance of the polymer-pigment interactions and of the inherent adsorption phenomena.

These aspects are discussed in the special reference books of the technical literature.

Other additives which may be present are capillary active agents and/or plasticizers.

The composition according to the present invention can be used for painting and coating metallic materials such us iron and iron alloys, tinned iron bands, copper and aluminium, and for insulating electric conductors.

According to the process of this invention a polymerization of the monomers above mentioned is carried out "in situ" on the surface of the metallic article concerned, with a subsequent cross-linking of the film, which is carried out in an oven at a temperature of from about 60° C. to about 180° C., and preferably from 80° C. to 150° C., for a time of from about 5 mins to about 120 mins, and preferably from 10 to 60 mins.

Under these conditions, the complete cross-linking of the performed polymer is carried out concurrently with the formation of a coating having high mechanical resistance properties and a high resistance to chemical and physical agents consistently with what has been outlined hereinbefore.

The basic advantages which are inherent in the process of the present invention are that it is now possible to obtain, under bland conditions, the thorough cross-linking of a polymer having tertiary alcoholic groups as lateral appendages. Under such bland conditions, in fact a polymer dehydration reaction takes place so that reactive unsaturations are originated, which interact with each other and originate a tridimensional insoluble lattice. By so doing in addition to the insolubilization of the polymer, also a structural modification of the film is brought about with the attendant formation of structures which withstand both moisture and aging.

The use of the composition according to the present invention for coating metallic articles permits, therefore that an improvement of protection of the coated articles may be obtained over the prior art, concurrently with a considerable decrease of the power consumption.

The experimental examples which are reported hereinafter are illustrative of the invention and do not limit same.

EXAMPLE 1

Preparation of 2-hydroxy-2-methypropyl acrylate

A stainless-steel autoclave having a volume of 200 mls is charged, in the order given, with: 36 g (grams) of acrylic acid, 15 mg (milligrams) of hydroquinone methyl ether, 0.8 g of benzyltrimethylammonium chloride and 36 g of 1, 1'-dimethylethylene oxide. The autoclave is immersed in an oil bath at 90° C. for 3 hours, it is allowed to cool and the product thereby obtained is distilled in a Claisen apparatus fitted with a rectification column, working in a vacuum (about 0.2 Torr) and raising the bath temperature up to 80° C.

A first fraction, 7.2 g, is obtained, which consists of virtually pure acrylic acid, and a central fraction, 43.1 g yield 60%, which is subjected to gaschromatographic analysis (SE column 30, 10%, 2 m, temp. 150° C.) coupled with mass spectrometry, the fraction being composed of: acrylic acid 2% by weight
2-hydroxy-2-methylpropyl acrylate: 91% by weight acrylates of the dimer of 1,1'-dimethylethylene oxide: 7%, by weight.

This fraction is utilized as such in the polymerization tests to be reported hereinafter.

POLYMERIZATION OF 2-HYDROXY-2-METHYLPROPYL ACRYLATE

A 50-ml, 2-neckled flask fitted with a magnetic stirring device is charged, in the order given and under a nitrogen blanked, with:

20 mls of benzene, 4 g of 2-hydroxy-2-methylpropyl acrylate and 80 mg of azo-bis-diisobutyronitrile. The flask is placed in a thermostatically controlled bath at 60° C. and the reaction is allowed to take place with stirring for a time of 2 hours. The formation of a precipitate is experienced, and the latter is separated from the supernatant liquor and washed three times with ethyl ether and dried in a vacuum thereafter.

There are thus obtained 2.6 g (yield 65%) of a polymer which is soluble in dimethylsulphoxide and in dimethylformamide (sample A) and shows at the thermal differential analysis a $T_g$ of $+11°$ C.

The previous test is repeated under the same conditions as before, by introducing, in the order given: 3 g of 2-hydroxy-2-methylpropyl acrylate, 1 g of acrylic acid and 80 mg of azo-bis-diisobutyronitrile.

Upon washing and vacuum drying, there are obtained 2.2 g of a polymer (yield 55%) which is soluble in dimethylsulphoxide and has a content of acrylic acid as high as 36%, as determined by titration with alcoholic solution of sodium hydroxide (Sample B).

The two samples, A and B, as obtained in the manner explained just now are subjected to thermogravimetric analysis (Apparatus Du Pont Model 900 and the plots which have been obtained are reported in FIG. 1.

It is noted that these samples, especially the sample B which contains acidic groups, undergo a decomposition still at 100° C. These results are confirmed by the data which are obtained by carrying out a cross-linking kinetics of the two samples at 120° C. After 5 minutes both the samples A and B become completely insoluble.

EXAMPLE 2 (COMPARISON EXAMPLE)

Polymerization of 4-hydroxybutyl acrylate

The polymerization tests described in Example 1 are repeated, but using the 4-hydroxybutyl acrylate as the monomer. Working under the same conditions, there are obtained 2.8 g of sample A (yield 70%) and 2.5 g of sample B (yield 62%), The latter has a content of acrylic acid equal to 39 molar %. The sample A has, when subjected to differential thermal analysis a $T_g$ of 64° C.

Figure 2:
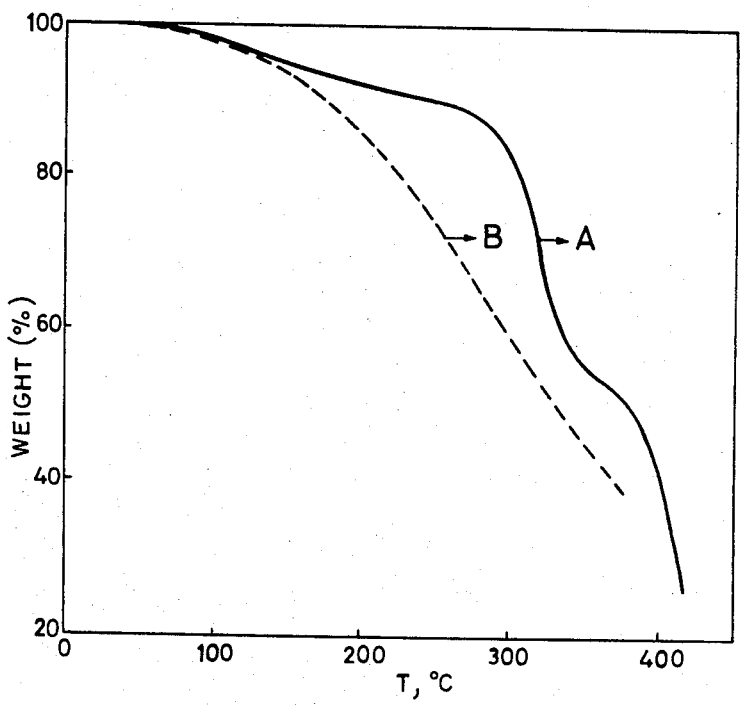
FIG. 2 represents the plots obtained when two samples (A and B) of polymerized 4-hydroxybutyl acrylate are subjected to thermogravimetric analysis.

The two samples are subjected to thermogravimetric analysis under the conditions of Example 1 and the two thermogravimetric plots shown in FIG. 2 are obtained. It will be noted, in comparison with FIG. 1, that these polymers decompose at positively higher temperatures.

These results are confirmed by the data as obtained through measurements of the cross-linking kinetics of the samples at various temperatures. More particularly, it is noted that it becomes necessary to adopt higher temperatures for cross-linking such samples. As a matter of fact, sample B becomes completely insoluble in 5 minutes by heating it to 200° C., whereas the sample A becomes insoluble in 20 minutes under the same conditions.

EXAMPLE 3

"In situ" polymerization of 2-hydroxy-2-methylpropyl acrylate

A 250-ml beaker is charged, in the order given, with:
180 mls distilled water
0.4 ml of tert.butyl hydroperoxide
20 g of 2-hydroxy-2-methylpropyl acrylte
2 g of acrylic acid The pH of the liquid solution thus obtained is measured in a Metrohm No632 apparatus and the value of 2.72 is obtained.

In this solution there are subsequently immersed steel plates having a size of 40 by 70 mm, which have previously been defatted by doubly washing them with dichloromethane and dried for 30 minutes at room temperature. The immersion times are varied up to a maximum of 4 minutes.

Figure 3:
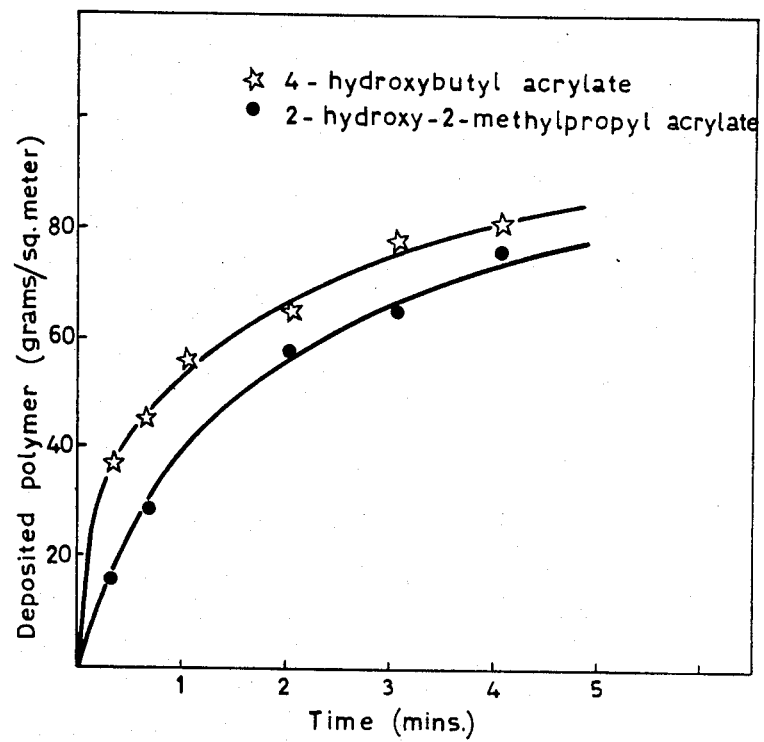
FIG. 3 presents the deposition curves of polymerized 2-hydroxy-2-methylpropyl acrylate and 4-hydroxybutyl acrylate. These curves show the relationship between the amount of polymer deposited with respect to immersion time.

The plates are then immersed in a beaker of distilled water, allowed to dry in air for 60 minutes and then placed in an oven at 140° C. for 20 minutes. After cooling, the plates are weighed to determine the quantity of polymer to be coated thereon. The deposition curve which has been obtained is shown in FIG. 3. This Figure shows that two minutes of immersion are enough to produce a deposition equal to about 50 g/m² (about 50 micron of film thickness), which correspond to an optimum value for the protective coating.

In the same FIG. 3, for comparison, is reported the deposition curve as obtained by using the composition indicated above, in which the 2-hydroxy-2-methylpropyl acrylate has been replaced by the same amount by weight of 4-hydroxybutyl acrylate. In this case, the samples are held in an oven at 200° C. for 30 minutes.

The two deposition curves shown in FIG. 3 show a like trend.

In connection with the technological properties of the samples obtained by 2-minute immersion, the comparison has given the folloing results, on taking into account that (A) connotes the plate coated by the composition which contains 2-hydroxy-2-methylpropyl acrylate and which has been heated to 140° C. for 30 minutes, whereas (B) connotes a plate coated by the composition which contains 4-hydroxybutyl acrylate and has been heated to 200° C. for 30 minutes.

|  | (A) | (B) |
|---|---|---|
| Adhesion test (checkered pattern) | 100% | 100% |
| Bending (Conical mandrel ASTM D-522) | very good | very good |
| Shock resistance | good | good |
| Resistance in salt mist chamber | 250 hrs | 150 hrs |

These results show that the formulation based on 2-hydroxy-2-methylpropyl acrylate, even if it had been cross-linked at a lower temperature, exhibits technological properties equal to those of the formulation based on 2-hydroxybutyl acrylate, and moreover, a resistance to the salt mist which is improved thereover.

EXAMPLE 4

The procedure is the same as in Example 3, but using the following composition:
180 mls of distilled water
0.4 ml of tert.butylhydroperoxide
10 g of 2-hydroxy-2-methylpropyl acrylate
10 g of 4-hydroxybutyl acrylate
2 g of acrylic acid The pH of the solution thus obtained is 2.65.

Steel plates, prepared as in the previous example, are immersed in the solution for a time of 2 minutes.

Upon drying, the plates are placed in an oven at 140° C. for 30 minutes.

The quantity of deposited polymer, average of six samples, in 46 g/m².

The technological tests on the so coated samples gave the following results:

| Adhesion | 100% |
|---|---|
| Bending | good |
| Shock resistance | good |

Resistance in salt mist chamber 220 hours.

These results show that it is possible to employ mixtures of acrylates of primary and tertiary alcohols, and at any rate, good properties for the samples cross-linked at 140° C. are obtained.

EXAMPLE 5

The procedure is the same as in Examples 3 but introducing kaolin in the composition. In this case, in order to prevent the settling of the pigment, the operation is carried out in the presence of an oligomer which contains acrylic functional groups. The oligomer which is employed is of the urethan-acrylic type and is obtained by reacting an excess of toluene diisocyanate with butanediol, the reaction with hydroxyethyl acrylate being subsequently caused to take place (average molecular weight about 1000).

The composition of the reaction bath is the following:
180 mls of distilled water
0.8 g of $(NH_4)_2 S_2O_8$
7 g of 2-hydroxy-2-methylpropyl acrylate
7 g of urethan-acrylic oligomer
6 g of kaolin, and
2 g of acrylic acid The pH of the dispersion thus obtained is 2.25. Steel plates are immersed in the dispersion with the same procedure as in the previous example.

By 4 minutes of immersion there is obtained the deposition of an average quantity of polymer which, upon drying and curing in an oven at 150° C. for 30 minutes, is 42 g/m².

The coating is homogeneous and has the pigment particulate embedded therein.

The adhesion of the coating to its substrate is 100% and the other technological properties are akin to those of the samples of Example 4.

EXAMPLE 6

The procedure is the same as in Example 3, but the following composition is used:
180 mls of distilled water
0.8 g of $(NH_4)_2 S_2O_8$
10 g of 2-hydroxy-2-methylpropyl acrylate
10 g of urethan-acrylic oligomer
0.2 g of phosphoric acid The urethan-acrylic oligomer is the same as that described in Example 5 and the pH of the solution thus obtained is 2.20.

Steel plates are immersed in the solution in the manner as described in the previous examples. By 4 minutes of immersion, the average deposit is obtained of a quantity of polymer, which, upon drying and curing in an oven at 150° C. for 30 minutes, is equivalent to 48 g/m².

Such a coating has an adhesion to its substrate of 100%, with good properties as to bending and resistance to shock and its resistance in a saline mist chamber is 150 hours.

The present Example is repeated but using 4-hydroxybutyl acrylate instead of the 2-hydroxy-2-methylpropyl acrylate.

The pH of the solution thus obtained is 2.10. By 4 minutes of immersion of the plates in the solution, these is obtained the deposition of an average quantity of polymer which, after drying and oven curing at 180° C. for 30 minutes, is equivalent to 38 g/m².

The technological properties of the sample are good but the resistance time in the saline mist chamber is but 24 hours.

EXAMPLE 7

"In situ" polymerization of 2,5-dimethyl-2,5-hexanediol monoacrylate

The procedure is the same as in Example 3, but using 2,5-dimethyl-2,5-hexanediol monoacrylate, as obtained by reacting acryloyl chloride with the corresponding diol, in the molar ratio: 1:1 and collecting by molecular distillation the central fraction: the latter shows, at the NMR analysis, to have the expected structure.

The following composition is prepared:
180 mls of distilled water
0.8 g of $K_2S_2O_8$
12 g of 2,5-dimethyl-2,5-hexanediol acrylate
5 g of 4-hydroxybutyl acrylate
3 g of acrylic acid.

The pH of the solution thus obtained is 2.10. Steel plates are immersed in the solution thus obtained as reported in the previous examples. By 3 minutes of immersion, there is obtained the deposit of an average quantity of polymer which, upon drying and treatment in an oven at 150° C. for 30 minutes, is equivalent to 47 g/m². The adhesion of the coating to its substrate is 100% and the other technological properties are akin to those of the samples of Example 4.

EXAMPLE 8

"In situ" polymerization of 2,5-dimethyl-3-hexyne-2,5-diol monoacrylate

The procedure is the same as in Example 3 but employing 2,5-dimethyl-3-hexyne-2,5-diol monoacrylate, as obtained starting from the corresponding diol, by reaction with acryloyl chloride, in the molar ratio of 1:1 and by collecting by molecular distillation the central fraction which, when analyzed for the NMR spectrum, exhibits the expected structure. The following composition is prepared:
180 mls of distilled water
0.8 g of $(NH_4)_2 S_2O_8$
12 g of 2,5-dimethyl-3-hexyne-2,5-diol acrylte
5 g of 2-hydroxyethyl acrylate
3 g of acrylic acid.

The pH of the solution thus obtained is 2.05. Steel plates are immersed in the solution so prepared, as reported in the previous examples. By 3 minutes of immersion the deposit is obtained of an average quantity of polymer which, upon drying and oven curing at 150° C. for 30 minutes, is equivalent to 42 g/m².

The adhesion of the coating to its substrate is 100% and the other technological properties are akin to those of the samples of Example 4.

We claim:

1. A process for coating a metallic substrate with a cross-linked polymeric film, comprising contacting the metallic substrate with an aqueous composition comprising:
   (a) at least one acrylic or metacrylic compound which can be defined by the general formula:

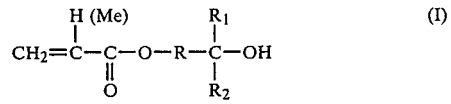

wherein:
R is a straight-line or branched aliphatic hydrocarbon radical, either saturated or unsaturated, having from 2 to 10 carbon atoms, or a cycloaliphatic or an aromatic group;
$R^1$ and $R^2$, which may be equal to or different from one another, are straight-line or branched alkyl groups, either saturated or unsaturated, having from 1 to 8 carbon atoms, or cycloaliphatic or aromatic groups;

(b) at least one unsaturated organic acid capable of being copolymerized with a compound of formula (I), in an amount of from 5 to 40 parts by weight per 100 parts of the compound, or an organic or a mineral acid that cannot be copolymerized with the compound (I), in an amount of from 1 to 10 parts by weight per 100 parts of the compound (I); and (c) a polymerization catalyst; and subsequently heating the metallic substrate which has been contacted with the polymeric composition at a temperature up to about 180° C. for a time necessary to effect cross-linking of the polymeric film coating the substrate.

2. The process of claim 1, wherein compound (I) is selected from the group consisting of:
2-hydroxy-2-methylpropyl acrylate, 2-hydroxy-2-methylpropyl metacrylate, 2-hydroxy-2-ethylpropyl acrylate, 2-hydroxy-1,2-dimethylpropyl acrylate, 2-hydroxy-1,1',2-trimethylpropyl acrylate, monoacrylate of 2,5-dimethyl-2,5-hexanediol, monometacrylate of 2,5-dimethyl-2,5-hexanediol, monoacrylate or monometacrylate of 2,5-dimethyl-2,5-dihydroxy-3-hexane and monoacrylate and monometacrylate of 2,5-dimethyl-2,5-dihydroxy-3-hexyne.

3. The process of claim 1, wherein compound (I) is replaced by a quantity up to 90% by weight, of a compound selected from the group consisting of: methyl acrylate and metacrylate, ethyl acrylate and metacrylate, butyl acrylate and metacrylate, 2-ethylhexyl acrylate and metacrylate, 2-hydroxyethyl acrylate and metacrylate, 2-hydroxypropyl acrylate and metacrylate, 4-hydroxybutyl acrylate and metacrylate, and 2-hydroxybutyl acrylate and metacrylate.

4. The process of claim 1, wherein the unsaturated organic acid which can be copolymerized ith compound (I) is selected from the group consisting of: acrylic acid, metacrylic acid, adduct of 2-hydroxyethyl acrylate or metacrylate with maleic acid anhydride and parastyrenesulphonic acid.

5. The process of claim 1, wherein the organic or mineral acid that cannot be copolymerized with the compound of formula (I) is selected from the group consisting of paratoluenesulphonic acid, methanesulphonic acid, sulphuric acid and phosphoric acid.

6. The process of claim 10, wherein the polymerization catalysts is selected from the group consisting of potassium persulphate, ammonium persulphate, cumyl hydroperoxide, tert. butyl hydroperoxide, peracetic acid, hydrogen peroxide and benzoyl peroxide.

7. The process of claim 1, characterized in that the aqueous composition further comprises epoxyacrylic resins, urethane-acrylic resins, pigments, capillary active agents and plasticizing agents.

8. The process of claim 1, characterized in that the metallic substrate is heated to a temperature of from about 60° C. to about 180° C. for a time period of from about 5 minutes to about 120 minutes.

9. The process of claim 8, wherein the metallic substrate contacted with said solution is heated to a temperature of from about 80° C. to about 150° C. for a time period of from about 10 minutes to about 60 minutes.

10. The process of claim 1 wherein the polymerization catalysit is selected from the group consisting of persulphates, hydroperoxides, peracids, $H_2O_2$ and peroxides.

11. The process of claim 1 wherein the metallic substrate is contacted with the aqueous solution containing the acrylic or metacrylic compound for a period of about 4 minutes.

* * * * *